May 22, 1956 D. S. OLIVER 2,746,132

FIXTURE AND METHOD OF ASSEMBLING GEAR PUMPS

Filed Sept. 11, 1952

Inventor:
Delbert S. Oliver
By Alonzo B. Kight
Atty.

United States Patent Office 2,746,132
Patented May 22, 1956

2,746,132

FIXTURE AND METHOD OF ASSEMBLING GEAR PUMPS

Delbert S. Oliver, Euclid, Ohio, assignor to Borg-Warner Corporation, Chicago, Ill., a corporation of Illinois Application September 11, 1952, Serial No. 309,001

5 Claims. (Cl. 29—156.4)

This invention relates to a method of assembling pressure loaded type, intermeshing gear pumps and to a fixture for use in accordance with this method.

In a pressure loaded, intermeshing gear type pump having one or more sets of axially movable pressure loadable bushings, a part of the output or discharge pressure generated by the pump is applied to the rear or motive surfaces of the axially adjustable bushings to urge these bushings into sealing engagement with their associated gears. As disclosed in U. S. Patent No. 2,420,622 to Lauck et al., by carefully selecting the relative areas of the forward surfaces of the bushings and of the motive surfaces of the bushings, it is possible to control within very close limits the actual sealing pressure provided and to maintain a somewhat higher effective pressure in the direction of establishing the seal than in the direction tending to open the seal.

Because the pressure loadable bushings must be able to move axially, a certain initial minimum clearance must be provided between the sides of the bushings and the adjacent sides of the chambers or bores in the pump housing cover in which the bushings are received. In practice, this clearance is actually very slight but it has been found that since the bushings and the cover may move either to one side or to the other of the pump chamber during assembly, occasionally a pump will be made in which the clearance of the bushing adjacent the inlet side of the pump is sufficiently great because of the shifted location of the cover and the corresponding reduction in clearance adjacent the discharge side of the pump to provide a substantial leakage path to inlet pressure. This leakage path is maintained during the operation of the pump due to the shifted alignment of the housing cover section as assembled despite the pressure generated by the pump which pressure, except for the shifted alignment of the cover, would move the bushings to the inlet side. The existence of the leakage path, of course, reduces materially the efficiency of the pump.

As disclosed in the earlier filed application of James A. Compton, Serial No. 174,606, filed July 19, 1950, it is possible to prelocate the bushings in the pump by employing shims, which are used only during an initial assembly step, to force the bushings toward the inlet side of the pump and then assembling the cover housing section on the pump body section. Then, with the parts held rigidly in position and the cover shifted, a dowel hole is drilled through the flanged mating portions of the two housing sections. Thereafter, the pump is disassembled, the shims removed, the usual sealing rings inserted and the pump reassembled with a dowel pin inserted in the drilled hole. The dowel pin maintains the shifted position of the cover established by the shims as the pump housing sections are finally bolted together, and thereby insures the desired location of the bushings in the housing.

Further development has revealed, however, that this method of assembly, while an improvement, does not always provide the ideal alignment of the bushings in the housing and that the cover may be shifted too far so that cocking of the bushing in the housing may occur during operation with resultant reduction in efficiency and increased wear.

An object of the present invention is to simplify and to improve the assembly of a pressure loaded intermeshing gear pump to insure proper location of the bushings in the pump housing.

A further object of the present invention is to provide a simple and effective fixture for use in assembling pressure loaded type gear pumps.

In accordance with one embodiment of this invention, a pressure loaded, intermeshing gear pump of the type having at least one set of bushings which are axially movable and pressure loadable, is assembled by first placing a pair of fixtures constructed in accordance with the present invention in the body portion of the housing in place of the usual paired bushings and gears and associated sealing elements. Each bushing has a large forward cylindrical portion of a size adapted to fit closely within the pump body chamber for which it is designed and a rear cylindrical portion of much smaller diameter adapted to fit closely in the pump cover section cavity. Each fixture has a pair of spaced, spring detents carried in the body thereof and extending from the side of the fixture adjacent the discharge side of the pump as the fixture is located in the pump housing. The detent in the forward portion of the fixture presses the fixture transversely toward the inlet side of the pump and away from the discharge side. The cover is then assembled on the body section of the housing. The detent in the rear portion of the fixture locates the cover in the desired alignment with respect to the body. Dowel holes are drilled through the flanged mating portions of the body and body housing sections and the pump then disassembled. Thereafter, the pump is assembled in usual fashion with the pressure loadable type bushings on the pumping gears, and the pump housing cover section placed in position on the body of the housing. Dowel pins are inserted in the drilled holes in the two sections of the housing. Thereafter, the housing sections are bolted securely together.

Other objects and advantages of the present invention will be apparent from the following detailed description thereof taken in conjunction with the drawings, wherein.

Figure 1:
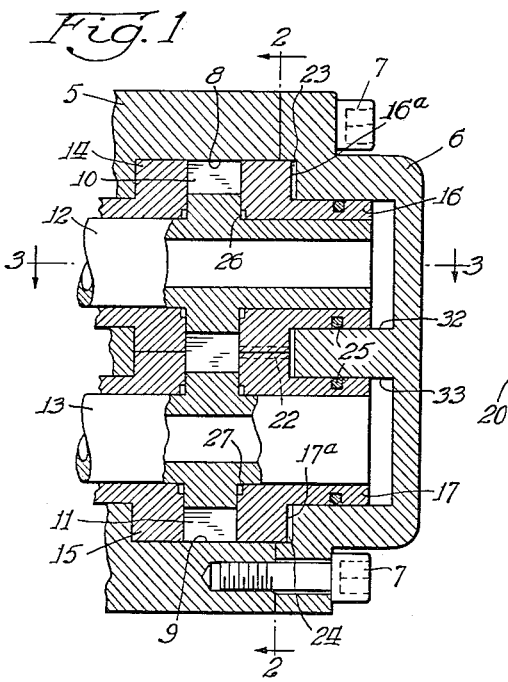
Fig. 1 is a fragmentary, axial, sectional view of a pressure loadable type intermeshing gear pump assembled in accordance with the method of the present invention.

Referring now to the drawings and particularly to Fig. 1 thereof, a pump generally similar to that shown in the aforementioned Roth et al. patent is illustrated comprising a sectional housing having a main body portion 5 and a right closure member or cover member 6. These sections are normally bolted together as by the bolts 7 and cooperate to define a pair of parallel axis, intersecting bores or pumping gear chambers 8 and 9 which are arranged to receive in complementary relationship intermeshing pumping gears 10 and 11, respectively. In the embodiment illustrated, the pumping gears have integrally formed therewith hollow journal shafts 12 and 13, respectively, and the left portions of the journal shafts 12 and 13 are received in conventional flanged bushings 14 and 15 mounted in the left portions of the pumping gear chambers 8 and 9. The right portions of the gear journals are received, respectively, in axially adjustable, pressure loadable flanged bushings 16 and 17 mounted in the right side of the pumping gear chambers.

Figure 2:
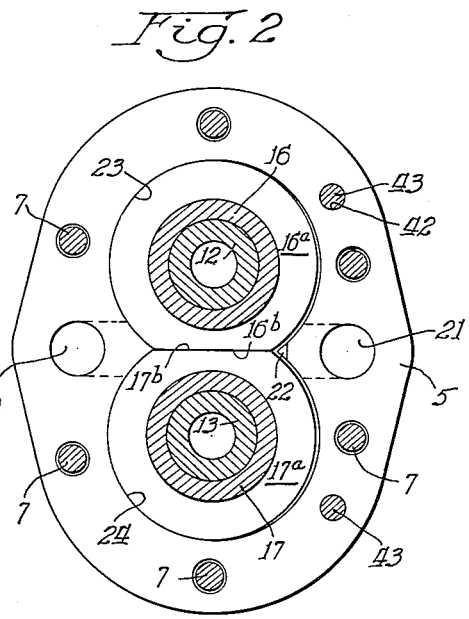
Fig. 2 is a transverse sectional view taken substantially along the line 2—2 of Fig. 1 showing the shifted location of the pressure loadable bushings.
Figure 3:
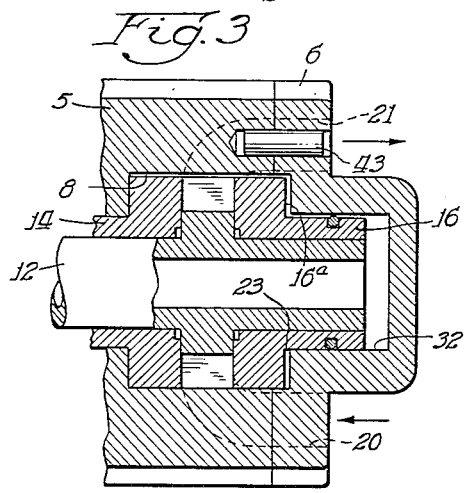
Fig. 3 is an enlarged, fragmentary vertical sectional view of the upper portion of the pump shown in Figs. 1 and 2, the view being taken along the line 3—3 of Fig. 1.

In the embodiment illustrated, the upper pumping gear 10 is the driving gear and is rotated in a clockwise direction, as viewed in Fig. 2. In accordance with conventional pump design practice the journal shaft of the upper gear may, therefore, be extended to the left, as viewed in Fig. 1, and coupled to a suitable power source. Low pressure liquid is introduced into the pump housing at inlet 20 formed in the left side of the pump housing, as viewed in Fig. 2, and high pressure liquid is discharged from the pump housing through outlet 21 formed in the right side of the housing, the inlet and outlet ports communicating with the inlet and discharge areas of the intermeshing pumping gears. The pressure loadable bushings are normally fitted into the bores with sufficient clearance to permit slight axial movement of the bushings with respect to the bores to establish the desired, pressure loaded seal during operation of the pump.

In the operation of a pump of this type, discharge pressure generated by the intermeshing gears may be communicated from the outlet or discharge side thereof to the annular pressure loading areas at the back of the bushing, designated 16-a and 17-a in the drawings, through an axially extending passage 22 formed between the peripheries of the flanged portions of the bushings on the discharge side of the pump at the point of convergence of the flanged portions of the bushings. Areas 16-a and 17-a cooperate with the adjacent walls of the housing bores 8 and 9 and the peripheries of the barrel portions of the bushings 16 and 17 to define annular pressure loading chambers 23 and 24 respectively. The passage 22 extends from the discharge side of the gears to the right, as viewed in Fig. 1, to the intercommunicating portions of the pressure loading chambers 23 and 24 at their point of juncture.

Escape of pressure rearwardly from the pressure loading surfaces is substantially prevented by means of an O-ring seal 25 disposed about the periphery of the rear or barrel portion of each bushing in a suitable annular groove formed in the periphery of the bushing or in the adjacent bore wall. Pressure leaking past the O-ring seal may be vented to inlet pressure or to a zone of intermediate pressure in accordance with conventional pressure loaded pump practice as set forth in the above-referenced Roth et al. patent.

In the embodiment illustrated, annular grooves or recesses 26 and 27, respectively, are provided in the pressure loadable bushings 16 and 17 and located radially inwardly of the roots of the gear teeth; these recessed areas are vented to a zone of lower than discharge pressure. By selecting the extent and configuration of these recessed areas, the net sealing force may be closely regulated. Alternatively, the recesses may be formed in the gear side faces.

Since it is necessary in order to permit the slight axial movement required of the bushings in order to establish a seal to fit the bushings with some clearance in the bushing receiving chambers and since in order to facilitate assembly it is the practice to form the bolt receiving holes in the cover slightly larger than the diameter of the bolts, the bushings may actually be assembled in the housing in such a manner that more clearance is provided adjacent the inlet side of the pump than adjacent the discharge side of the pump. That is to say, that the cover may be shifted toward the discharge side of the pump sufficiently to establish a minimum clearance between the bushings and the housing adjacent the inlet side of the pump, which minimum clearance is maintained during the operation of the pump due to the shifted location of the cover and despite the generation of pressure on the discharge side of the pump which would otherwise tend to move the bushings against the inlet side of the housing. In the operation of the pump, the pressure applied to the pressure loading chambers 23 and 24 is substantially equivalent to discharge pressure and the leakage path provided by such excessive clearance may be sufficient to materially reduce the efficiency of the pump.

On the other hand, the cover may be shifted too far toward the inlet side and as a result, when the bushings are assembled in the pump, the bushings may be cocked so that wear is concentrated on the bushing forward faces adjacent the inlet side of the pump instead of being uniformly distributed over these bushing faces. Also, under these conditions, the seal is not uniform since the bushing forward surfaces adjacent the outlet side of the pump are slightly spaced from the gear side faces. This spacing may be sufficient to reduce pumping efficiency.

It is found in accordance with the present invention that this undesirable condition can be substantially eliminated by establishing the location of the pump cover prior to final assembly of the pump in such manner that the clearance between the inlet side wall of the pump body chamber and the adjacent side wall of the bushings is held to a negligible amount and at the same time the necessary alignment of the cover cavity with respect to the body chamber to prevent cocking of the bushings is assured. Means are provided for maintaining this established relation during and after assembly of the pump.

Figure 4:
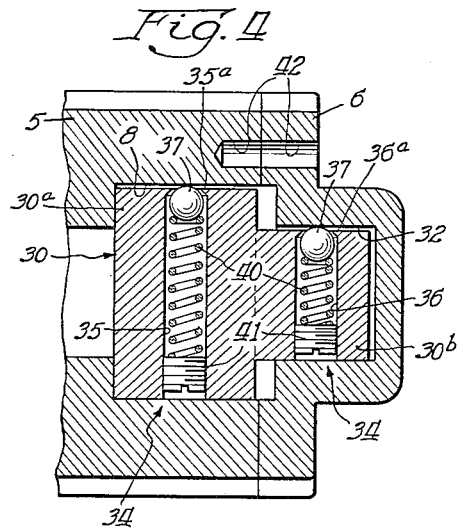
Fig. 4 is a view similar to Fig. 3 showing one of the assembly fixtures in position.
Figure 5:
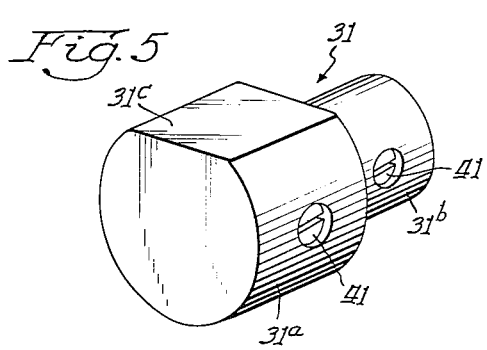
Fig. 5 is a perspective view of the other assembly fixture.

More particularly, in the assembly of the pump in accordance with the present invention, in place of the fixed bushings, the pumping gears, and the axially movable, pressure loadable bushings, bushing fixtures 30 and 31 are assembled in position in the pump chamber. Referring to Figs. 4 and 5 it will be seen that these bushing fixtures are solid cylindrical bodies having a forward, generally cylindrical portion 30a and 31a and a rear, generally cylindrical portion 30b and 31b, respectively. As shown in Fig. 5, the surface 31c of the fixture 31 is flattened. The corresponding surface of the forward portion 30a of the other bushing fixture is also flattened to provide a mating surface, and in the assembly of the fixtures in the pump body chamber these flattened surfaces are adjacent in similar manner to the opposed flattened surfaces 16b and 17b of the flanged portions of the bushings 16 and 17. The forward portion 30a of the bushing fixture 30 fits closely into the pumping gear chamber 8 and the corresponding portion of the fixture 31 fits closely into the chamber 9 in the housing body.

The rear portions 30b and 31b similarly fit closely in the cavities 32 and 33 formed in the cover 6, occupying thus the space normally occupied by the rear or barrel portions of the bushings 16 and 17.

In order to establish the preferred location of the cover with respect to the body so as ultimately to properly locate the bushings, spring pressed detents 34 are provided for the fixtures 30 and 31 to shift the fixtures to the inlet side of the pump housing and to shift the cover into alignment with the fixtures. More particularly, holes 35 and 36 are formed in the forward and rear portions of each fixture, the holes extending transversely as indicated in Fig. 4. The detents which each comprise a ball 37, a spring 40 and a retaining screw 41 are assembled in the respective holes, the balls being retained by inwardly turned lips 35a and 36a formed at one end of each hole. The sizes of the balls and the sizes of the orifices defined by those lips are selected so that the balls normally protrude about one-tenth their diameter from the side of the fixture. The precise amount of protrusion is important since too great a protrusion renders difficult insertion of the fixtures in the chambers due to improper camming.

It will be noted that the detent heads are both located on the same side of the fixture. When assembled in the pump housing the detent heads are located on the discharge side of the pump. The forward detent thus shifts the fixture to the inlet side of the housing, while the rear detent shifts the cover toward the discharge side to align the cover cavity wall on the inlet side of the pump with respect to the body chamber wall on the inlet side.

It will be apparent that the final location of the cover is established by the location of the periphery of the rear portion of the fixture with respect to the periphery of the forward portion. This in turn is, of course, selected to provide such a locational relationship between these peripheral surfaces as to insure that when the pump bushings are assembled in position the bushings will not be cocked.

After the pump cover section 6 has been assembled in place on the pump body housing, with the fixture in place, the two housing sections are then clamped securely in position so that dowel holes 42 may be drilled through the flanged mating portions of the housing sections 5 and 6. After drilling the dowel holes, the pump is disassembled, the fixtures removed and then the pump reassembled with the usual bushings 16 and 17 in place accompanied by the usual sealing means.

Dowel pins 43 are then inserted in the drilled holes 42 so that when the cover is assembled on the body section it will occupy the same relative position with respect thereto as when the fixtures were used in the previous assembly operation. The dowel holes and pins may be supplied tapered so that the pins may be wedged in place or the outer ends of the pins peened to secure the pins in the holes. The housing bolts 7 are then threaded into the body section and secured to complete the assembly of the pump.

It will be understood that the actual shifting of the bushings by the displacement of the cover 6 with respect to the housing body section 5 is slight. Accordingly, the usual clearance provided in the bolt receiving holes in the pump housing is adequate to permit threading the bolts 7 into position despite the slight displacement of the cover 6 with respect to the body section 5. Also, while a single dowel pin and dowel hole may be employed, it will be evident that where two or more pins are employed with the pins spaced about the periphery of the housing, a closer control of the location of the bushings is obtained.

In practice, it has been found that employing this invention not only materially reduces the number of rejects for failure to provide the required pumping efficiency but also affords wider tolerances in the fitting of the bushings in the pump. Heretofore, a bushing which was more than a slight amount smaller than the bore in which it was to be positioned had to be rejected because of the reduction in pumping efficiency that could result. The present invention, by establishing a minimum clearance in the area where leakage can be a factor, that is, the area adjacent the inlet or low pressure side of the pump, permits substantially greater latitude in the use of the undersized bushings without serious loss in efficiency.

Where herein the various parts of this invention have been referred to as being located in a right or left position, or an upper or a lower position, it will be understood that this is done solely for the purpose of facilitating description and that such references relate only to the relative positions of the parts as shown in the accompanying drawings.

What is claimed is:

1. A fixture for facilitating assembly of a pump comprising a block having a forward cylindrical portion and a reduced diameter rear cylindrical portion joined thereto, said forward portion having a flattened face, a first spring-pressed detent carried by said forward portion of said block and protruding slightly from one side of said block, and a second spring-pressed detent carried by the rear portion of said block and protruding slightly from said one side of said block for operation in the same direction as said first detent, said first and second detents lying in a plane parallel to the flattened face.

2. A fixture for facilitating assembly of an inter-engaging gear type pump having a pair of intercommunicating pumping chambers defined within a pump body housing section and a cover section adapted to be mounted on said body section and having a pair of cavities formed therein to receive pumping gear bushing ends and pumping gear shaft ends, said fixture comprising a block having a large forward cylindrical portion adapted to be received in one of said pumping chambers and a reduced diameter rear cylindrical portion joined to said forward portion, said forward portion having a flattened face thereon adapted to be received in one of said cavities, a first spring-pressed detent carried by said forward portion of said block and protruding slightly from one side thereof so as to engage an opposed side wall of said chamber when said block is assembled in said housing, and a second spring-pressed detent carried by the rear portion of said block and protruding slightly from said one side of said block so as to engage a side wall of said cavity when said cover is assembled on said housing said first and second detents lying in a plane parallel to the plane of the flattened face for movement by said springs in the same direction.

3. A pair of fixtures for facilitating assembly of an intermeshing gear type pump of the type including a housing having a pair of inter-communicating chambers adapted to receive inter-engaging pumping gears of the type wherein said gears have supporting shafts extending therefrom with which are normally associated bushings, the outer end portions whereof are received in cavities formed in a cover section of the pump housing, said pair of fixtures comprising a first fixture having a large forward cylindrical portion and a reduced diameter rear portion joined thereto, said forward portion being adapted to be received in one of said pump chambers, and said rear portion being adapted to be received in one of said cover cavities, and a second block having a large forward cylindrical portion and a reduced diameter rear cylindrical portion joined thereto, said latter forward portion being adapted to be received in the other of said pump chambers, and said latter reduced diameter rear portion being adapted to be received in the other of said cover cavities, the adjacent surfaces of said forward portions being flattened to provide mating surfaces, each of said forward portions having a spring-pressed detent carried therein and protruding slightly therefrom, and each of said rear portions having a spring-pressed detent carried therein and protruding slightly therefrom, all of said detents being located on the discharge side of said pump.

4. The method of assembling a pressure-loaded type intermeshing gear pump of the type having at least one set of pressure-loadable bushings adapted to engage the gear side faces in sealing relation, which comprises the steps of inserting a pair of fixtures in the pump housing in place of the intermeshing gears and pressure-loadable bushings said fixtures being formed to the contour of said pump housing and having resilient means disposed therein, displacing the fixtures toward the inlet side of the housing by detent members carried by the fixtures, and displacing the housing cover section toward the outlet side of the pump by detents carried by said fixtures, removably securing said cover section to said housing, forming dowel holes extending through the housing section, disassembling the pump to remove the fixtures, reassembling the pump with the bushings and gears in normal position, inserting dowel pins in the dowel holes to establish the relative positions of the housing sections, and then securing the sections together to complete the assembly of the pump.

5. A method of assembling a pressure loaded type intermeshing gear pump comprising the steps of inserting fixtures in the pump housing section, said fixtures being formed according to the contour of the pump housing and having resilient means disposed therein, displacing the fixtures towards the inlet side of the housing by operation of said resilient means, assembling the housing cover section over the fixtures and adjacent the housing section, displacing the housing cover section towards the outlet side of the pump by means of said resilient means, removably securing said cover section to said housing section, forming aligned dowel holes in said cover section and said housing section, disassembling the pump housing and cover sections to remove the fixtures, reassembling the pump with the bushings and gears in their normal positions, inserting dowel pins in the dowel holes to establish the relative positions of the cover section and housing section, and then securing the sections together to complete the assembly of the pump, said dowel pins properly aligning the pumping cavities and bushings of the pump.

References Cited in the file of this patent

UNITED STATES PATENTS

| | | |
|---|---|---|
| 1,026,006 | Thiem | May 14, 1912 |
| 1,189,802 | Eckert | July 4, 1916 |
| 1,921,379 | Bailey | Aug. 8, 1933 |
| 2,633,040 | Schlage | Mar. 31, 1953 |